Jan. 1, 1952 W. P. OEHLER 2,581,286
SPEED RESPONSIVE DEVICE FOR PLANTERS
Filed Nov. 5, 1949
2 SHEETS—SHEET 1

INVENTOR.
WILLIAM P. OEHLER
BY
*C. T. Parker* *R. C. Johnson*
ATTORNEYS

*INVENTOR.*
WILLIAM P. OEHLER

Patented Jan. 1, 1952

2,581,286

UNITED STATES PATENT OFFICE 2,581,286

SPEED RESPONSIVE DEVICE FOR PLANTERS

William P. Oehler, Moline, Ill., assignor to Deere & Company, Moline, Ill., a corporation of Illinois Application November 5, 1949, Serial No. 125,690

2 Claims. (Cl. 116—57)

The present invention relates generally to agricultural machines and more particularly to planters and other machines in which the maintenance of the proper rate of travel over the ground is an important factor in the operation of the machine.

The object and general nature of the present invention is the provision of a new and improved speed-responsive alarm device particularly applicable to farm machines, such as planters and the like, and it is an important feature of this invention to provide an alarm device which is so constructed and arranged as to provide an occasional signal when the operation of the machine is at or within the desired limits but will provide a continuous signal when the machine is operated at an excess speed.

These and other objects and advantages of the present invention will be apparent to those skilled in the art after a consideration of the following detailed description of a preferred embodiment, taken in conjunction with the accompanying drawings in which said embodiment has been illustrated.

Figure 1:
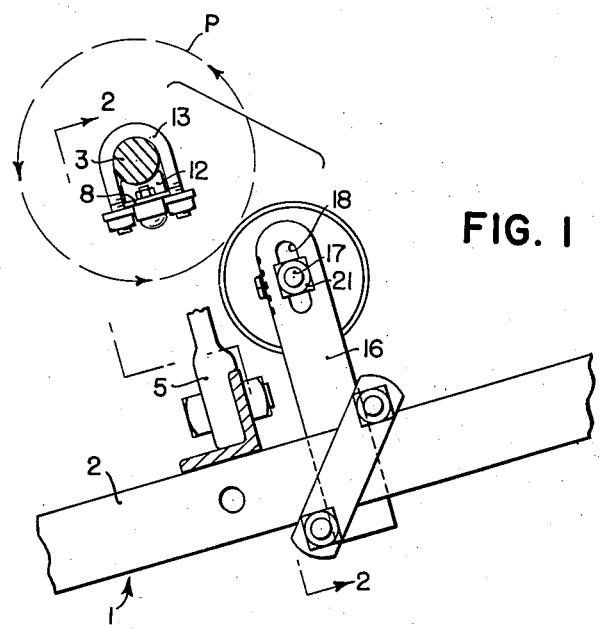
Figure 1 is an end view of an alarm device constructed according to the principles of the present invention and shown as mounted on a corn planter.
Figure 2:
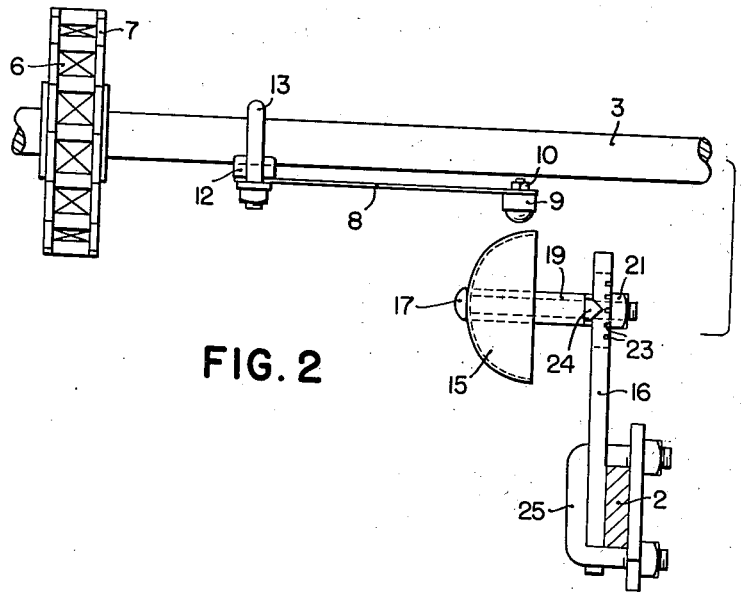
Figure 2 is a sectional view taken generally along the line 2—2 of Figure 1.
Figure 3:
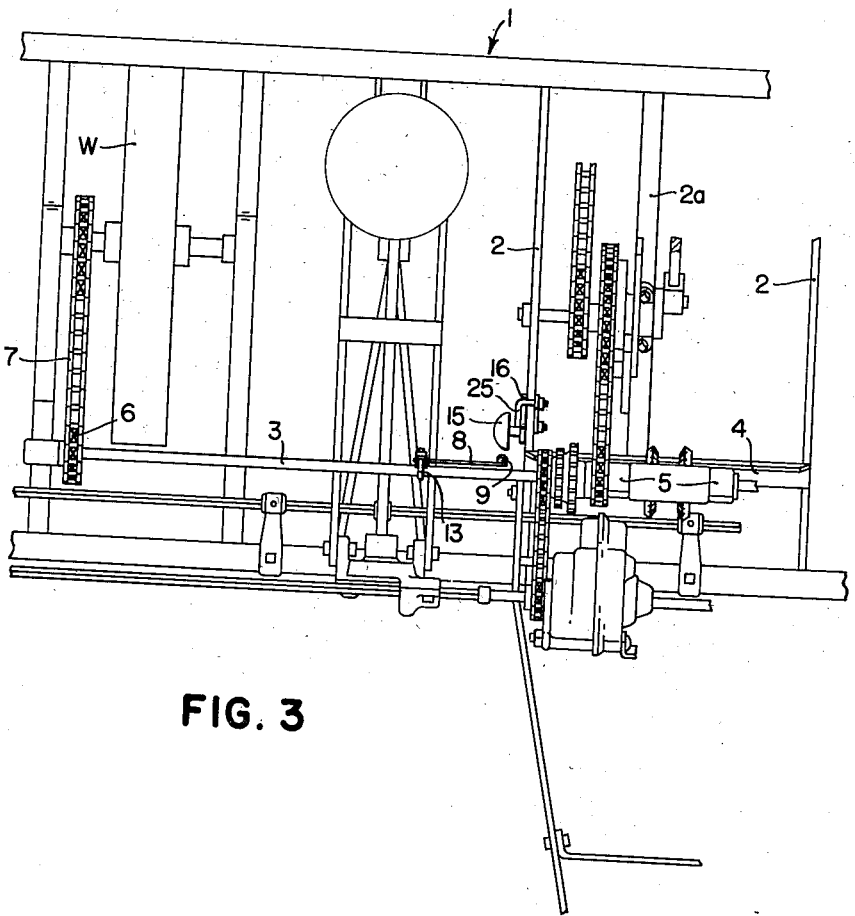
Figure 3 is a perspective view of a portion of a corn planter on which the device of the present invention has been mounted.

Referring now to the drawings, the speed-responsive alarm device of the present invention is shown as incorporated in a corn planter of the type shown in U. S. Patent 2,376,464, issued May 22, 1945, to C. H. White. The frame of the planter is indicated by the reference numeral 1 and includes a pair of longitudinally extending crossbars 2 and an intermediate angle bar 2a. The planter is provided with a jackshaft 3 from which certain parts of the planter 1 are actuated, and the jackshaft 3 is supported on an angle bar 4, carried by the bars 2, 2a and 2, by a pair of brackets 5. The jackshaft 3 is driven by means including a sprocket 6 fixed to the shaft 3 and a chain 7 which is trained over the sprocket 6 and over a sprocket actuated by one of the ground wheels W by which the frame 1 is supported. The jackshaft 3 therefore rotates at a speed that is proportional to the rate of travel of the planter over the ground. The planter preferably is propelled by a farm tractor or other controllable source of power, whereby the operator may determine the speed of travel of the outfit.

In planting corn, for example, particularly with the high speed planters available today, it is essential that the speed be kept within desired limits. For example, the valve mechanisms and other parts of the planter shown in the patent described above are so constructed and arranged to operate properly at a ground speed of five miles per hour. However, if this speed is exceeded by any substantial amount, the oscillating parts of the planter, such as the upper and lower valves, may be subjected to abnormal stresses, and therefore it is desirable to provide speed-responsive means which while simple and inexpensive is yet adequate to warn the operator if and when he should exceed the planting speed for which the machine is designed.

With this in mind, the present invention contemplates the addition of a speed-responsive device to the jackshaft 3 which will afford a warning to the operator when, for example, a speed of five miles per hour is exceeded by a substantial amount. According to the principles of the present invention, I provide a flat spring arm 8 which at one end carries a weight 9 attached to the spring by a bolt 10 or other suitable means. The spring 8 is arranged to extend along the shaft 3 and at its other end is rigidly and firmly fixed to the shaft 3 by any suitable means, such as a clamping block 12 and a U-bolt 13.

An audible alarm element in the form of a bell 15 is connected to a bracket 16 by a bolt 17 that extends through a hole in the bell 15 and a slot 18 in the upper end of the bracket 16. A bushing 19 is disposed about the bolt 17 between the bell 15 and the bracket 16 whereby when the nut 21 is tightened the bell is rigidly mounted in position, which may be varied, as desired, by loosening the nut 21 and shifting the bolt to a new position. The bracket 16 may be provided with graduations 23 along one edge, with which an arm 24 fixed to the inner end of the bushing 19 cooperates. The bracket 16 is fixed to any suitable part of the planter frame 1, such as the bar 2, by means of a U-bolt clamp 25. If desired, the bell may be adjusted to different positions by loosening the U-bolt clamp 25 and shifting the bracket 16 to different positions. Also, the spring 8 and associated parts may be shifted along the shaft 3 by loosening the U-bolt clamp 13, changing the position of the point of anchorage of the spring 8, and then tightening the clamp 13.

The parts are adjusted so that at the desired speed, for example, five miles per hour, the weighted end 9 of the spring 8 swings radially outwardly, relative to the shaft 3, due to the rotation of the latter so as to move in a normally circular path P which lies outwardly of but closely adjacent to the bell 15. Since agricultural machines, such as planters and the like, usually operate over relatively uneven ground, an implement equipped with the speed-responsive alarm means of the present invention ordinarily is subjected to a certain amount of vibration which has the effect of momentarily changing the path of movement of the weighted end 9 of the spring 8. That is, where the normal path of movement P of the weighted end 9 lies closely adjacent the bell 15, vibrations of the machine during travel may cause the end 9 to strike the bell 15 at intervals, depending upon the frequency of the vibrations of the machine during travel. If, however, the rate of travel of the machine is increased a substantial amount above, for example, five miles per hour, the normal path of movement of the striker end 9 becomes greater and the bell 15 is struck at each revolution of the shaft 3. The operator will then know by virtue of the continuous sounding of the bell 15 that he is driving the tractor too fast, exceeding the limit for which the machine has been designed. However, if he hears the bell only occasionally, he knows that he is driving at the correct speed, and if he does not hear the bell at all, he will know that he is not driving fast enough.

Where the fields are very smooth or if, for any reasons, the alarm device is arranged so as to be more or less unresponsive to vibrations, the operator with the present device may readily drive the outfit at the desired speed. For example, the operator may momentarily increase the speed of the outfit until the alarm is sounded and then slightly decrease the speed until he no longer hears the alarm, the slightly decreased speed therefore being substantially the desired speed at which the outfit is designed to be operated.

While I have shown and described above the preferred structure in which the principles of the present invention have been incorporated, it is to be understood that my invention is not to be limited to the particular details, shown and described above, but that, in fact, widely different means may be employed in the practice of the broader aspects of my invention.

What I claim, therefore, and desire to secure by Letters Patent is:

1. In an agricultural machine adapted to be drawn over the ground and to be subject to vibrations and the like incident to unevenness of the ground, said machine having a frame, a ground wheel, and a shaft driven by said ground wheel, the combination therewith of a speed-responsive alarm comprising a single spring member fixed at one end to said shaft and adapted to have its other end swing radially outwardly of said shaft in response to centrifugal force due to rotation of said shaft, said other end moving in a given path of revolution at a desired speed of rotation of said shaft, an alarm device adapted to be struck by said other end of said spring member to be actuated thereby, and means fixing said device to said frame by, and means fixing said device to said frame in a position closely adjacent but generally below and radially outside of said path of movement so that, at said speed of rotation of said shaft, said alarm device will be actuated at occasional intervals when the sudden generally vertically upwardly directed acceleration of the machine, incident to travel of the machine over uneven terrain, acts on said spring cumulatively with the centrifugal force due to rotation of said shaft at or near said desired speed of rotation and momentarily causes said other end of said spring member to move beyond said given path and engage said alarm device, whereby the operator will know by virtue of said occasional operations of the alarm device that he is operating the machine substantially at the rate sufficient to actuate said shaft at said desired rate of rotation.

2. For use in an agricultural machine of the type adapted to be drawn over the ground and to be subject to vibrations and the like incident to unevenness of the ground, said machine having a frame, a ground wheel, and shaft driven by said ground wheel, the improvement consisting in a speed-responsive alarm comprising a single spring member adapted to be fixed at one end to said shaft and adapted to have its other end swing radially outwardly of said shaft in response to centrifugal force due to rotation of said shaft, said other end moving in a given path of revolution at a desired speed of rotation of said shaft, an alarm device adapted to be struck by said other end of said spring member to be actuated thereby, and means fixing said device to said frame in a position generally below but generally radially outside of said path of movement so that, at said speed of rotation of said shaft, said alarm device will be actuated at occasional intervals when the sudden generally upwardly directed acceleration to which the machine is subjected when moving over uneven ground, acts on said spring cumulatively with the centrifugal force due to rotation of said shaft at or near said desired speed of rotation and momentarily causes said other end of said spring member to move beyond said given path and engage said alarm device, whereby the operator will know by virtue of said occasional operations of the alarm device that he is operating the machine substantially at the rate sufficient to actuate said shaft at said desired rate of rotation.

WILLIAM P. OEHLER.

REFERENCES CITED

The following references are of record in the file of this patent:

UNITED STATES PATENTS

| Number | Name | Date |
| --- | --- | --- |
| 379,745 | Ulsh | Mar. 20, 1888 |
| 550,106 | Lewis | Nov. 19, 1895 |
| 812,937 | Koblizek | Feb. 20, 1906 |
| 1,377,243 | Dix et al. | May 10, 1921 |

FOREIGN PATENTS

| Number | Country | Date |
| --- | --- | --- |
| 21,026 | Great Britain | Sept. 27, 1902 |